May 26, 1942.  A. D. REDNER  2,284,447

FILTER

Filed Nov. 15, 1937

INVENTOR.
Arthur D. Redner
BY Joseph Farley
ATTORNEY.

Patented May 26, 1942

2,284,447

UNITED STATES PATENT OFFICE 2,284,447

FILTER

Arthur D. Redner, Detroit, Mich., assignor to General Filters Inc., Detroit, Mich., a corporation of Michigan Application November 15, 1937, Serial No. 174,502

2 Claims. (Cl. 210—131)

This invention relates to filters and particularly to filters intended to be used in filtering the engine oil of internal combustion engines, though it is not necessarily restricted to such use.

One of the objects of the invention is the provision of a filter of the class described wherein the effective filtering pressure is maintained at a pre-determined value which is independent of the actual oil pressure so that the passage of the oil through the filtering material may take place under optimum pressure conditions.

In the conventional type of filter some difficulty is found in cold weather operation. This is largely due to the fact that when the engine and filter have not been operating both assume atmospheric temperature and, in cold weather, the filter proper may become substantially impermeable because of the then high viscosity of the oil standing within it. When engine operation is resumed, though the engine oil is quickly heated, little or no filtering takes place due to the then impermeability of the filter. It is another object of the invention to avoid this effect by the provision of an automatic heat regulating means whereby should the filter be used during cold weather substantially all of the oil to be filtered may be initially by-passed around the surface area of the filter so as to warm the filter up to operating temperature after which the filter automatically restores itself to normal operating conditions.

Another object of the invention is the provision in a filter of the class described of a cartridge or container of filtering material in which the oil to be filtered is passed successively through coarse and fine filtering materials, and in which the coarse filtering materials serve also to distribute the oil to a relatively large surface of the fine filtering material and prevent undue packing thereof.

A further object of the invention is to provide a filter of the class described with a cartridge of filtering material which is quickly and easily removable from the remainder of the structure without the use of tools and without the necessity of detaching oil conduits.

Other features, objects and advantages of the invention will readily appear from a reading of the following detailed description thereof accompanied by the drawing listed below.

Figures 1, 2, 3:
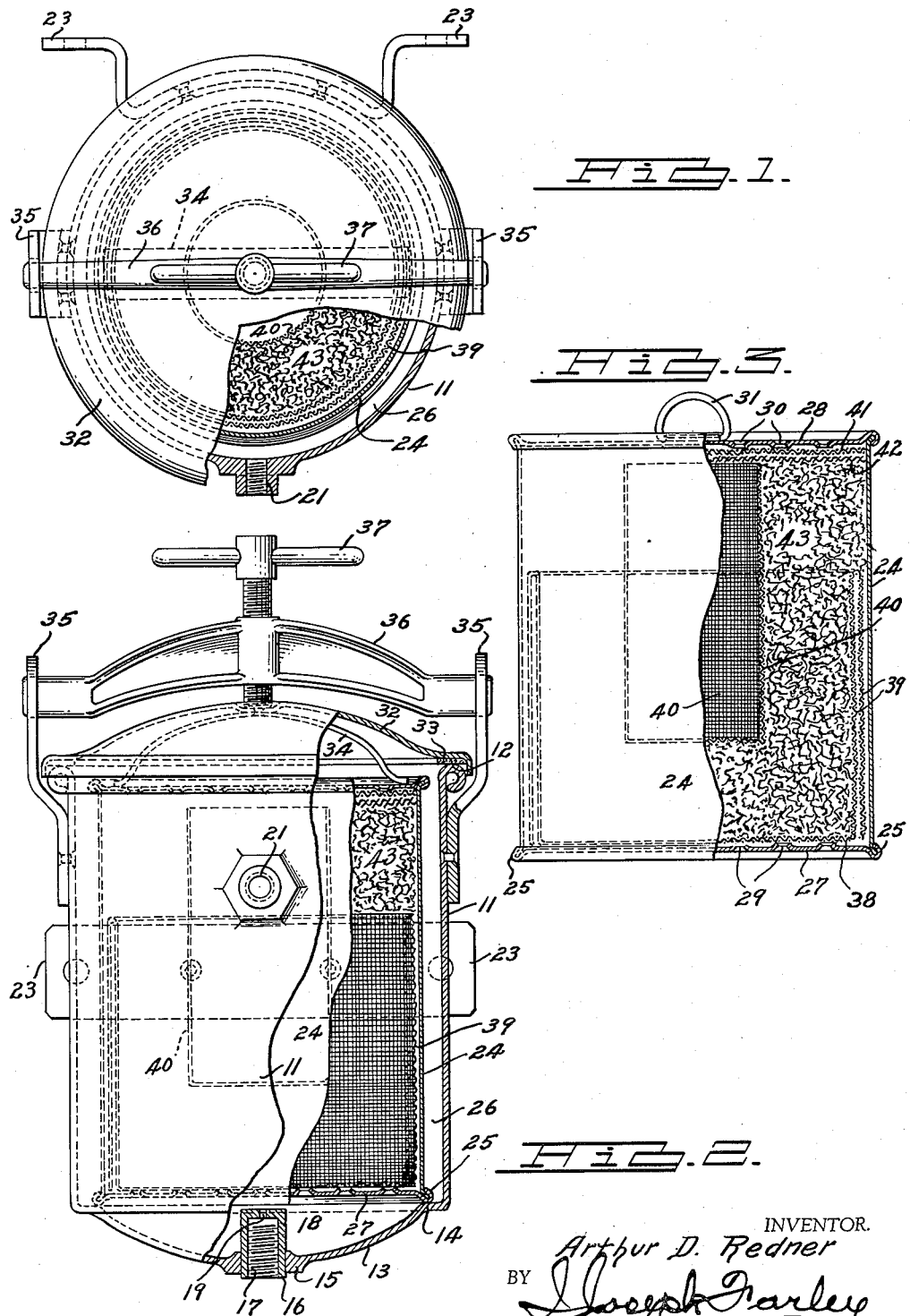
Fig. 1 is a top plan view of the filter, partly in section.
Fig. 2 is an elevational view partly in section showing the general arrangement of parts and a portion of the internal structure of the device.
Fig. 3 is an elevational view of the filtering cartridge, partly in section to show the construction of the cartridge.

As best indicated in Fig. 2, the device comprises a casing 11 having a cylindrical side wall, an open top 12 formed by the knurled edge of the side wall, and a generally spherical or conical outwardly projecting bottom 13. An examination of Fig. 2 will disclose that the bottom 13 is provided, at its outer portion, with a marginal ledge 14 lying in the radial plane of the casing 11 and, at the center, with an extruded portion 15 to which there is welded or otherwise suitably attached an inlet nipple 16, extending upwardly into the sump or basin 18 formed by the bottom 13. The inside wall of the nipple 16 is threaded as at 17 to receive the oil inlet conduit (not shown) and the end of the nipple is closed except for a small metering hole 19. At one side the container 11 is suitably provided with an outlet orifice 21 in which there may be attached an outlet conduit (not shown). Suitable brackets 23 for mounting the device on an automobile or other structure may be provided at the side of the casing 11.

Within the casing 11 there is located a cylindrical cartridge 24 constructed of galvanized steel or other similar material and containing within it substances designed to cleanse and purify the engine oil. The diameter of cartridge 24 is slightly less than the inside diameter of the casing 11 so as to provide therebetween an annular space 26 in which oil may be received. In the embodiment shown in the drawing the cartridge is constructed like the conventional tin can and has a downwardly extending rim 26 at the bottom of the cartridge which rests upon the shoulder 14 in the bottom of the casing 11 and divides the interior of the casing into two compartments, the sump portion 18 below the rim 25, and the annular portion 26 above the rim 25 and between the sides and top of the cartridge 24 and the casing 11. The bottom 27 and top 28 of the cartridge 24 are each suitably perforated at numerous points 29 and 30 in order to allow the oil to enter the cartridge at the bottom through perforations 29, pass upwardly through the filtering material in the interior of the cartridge and leave the same through the perforations 30 at the top. For handling the cartridge, a suitable wire loop 31 may be provided at the top. The cartridge 24 is maintained in position within the container 11 by a cup-shaped cover plate 32, provided at its edge with a gasket 33 and adapted to be positioned on the open end of container 11 and in sealed relationship with the edge 12 thereof. Spring means 34 within the cover plate 32 and attached thereto serve to urge the cartridge 24 into seated relationship with the shoulder 14.

Suitable means may be provided for securely fastening the cover plate 32 to the casing 11 and, as shown in the drawing, may include a pair of lugs 35 fastened on either side of the container 11 and a cross-arm 36 engaged in the lugs and provided at the center with a threaded member 37 adapted to force the cover 32 into sealed relationship with the top edge of casing 11.

As is best illustrated in Fig. 3, the interior of the filtering cartridge 24 is provided with several different screening and filtering materials designed and positioned to afford progressive screening, to permit access to and efficient use of substantially all of the finest filtering material and to render the oil path through the fine filtering material substantially the same in different parts of the cartridge. The cartridge 24 directly inwardly of the perforated bottom 27 thereof, is provided with a coarse screen 38. A similar screen 39 of double thickness lies directly inwardly of the sides of the cartridge 24 and extends upwardly approximately three-quarters the height of the cartridge. Likewise in the middle there is a screened core 40 which commences at a point approximately a quarter of the distance up from the bottom of the cartridge 24 and extends to the top of the cartridge. Directly below the perforated top 28 of the cartridge are successively a coarse screen 41, and a fine felt disk 42. The remaining part of the interior of the cartridge 24, that is, the space between sides of screen core 40 and the side screen 39 and the space between the bottom screen 38 and the felt disc 42 and the bottom of screen core 40 is filled with very fine filtering material 43.

The operation of the device is as follows:

The oil to be filtered enters through the intake nipple 16 at the bottom of the device and collects in the sump or basin 18 formed between the curved bottom 13 of the casing and the bottom 27 of the container or cartridge 24. The seal between the depending rim 25 and the shoulder 14 not being completely oil tight part of the oil will escape upwardly into the annular space 26 between the cartridge and the side wall of the container. The seal, however, will be sufficiently perfect to cause a certain degree of pressure in the sump 18 and thereby force a portion of the oil through the holes 29 in the bottom of the cartridge 24. After entering the cartridge the oil will flow rather easily and quickly up the double side screen 39 lying directly within the cylindrical surface of the cartridge, whereby it will be brought into contact with a substantially large area of the filtering element 43. Thereafter the oil will be urged upwardly through the filtering element 43, through the felt disc 42, the top screen 41 and out through the openings 30 in the top of the cartridge. A substantial part of the oil will flow through the filtering material to the screen core 40, from whence it will flow out the cartridge through the central part of the felt disc 42 and top screen 41. After having passed through the cartridge 24 the oil will flow across the top thereof and downwardly in the space 26 between the casing 11 and the sides of the cartridge, where it will meet the oil which has flowed out from under the bottom of the cartridge. The oil from both sources will escape through the outlet orifice 21.

In this connection it might be pointed out that the screens 38, 39 and 40, which may be of fine wire mesh or coarse fabric or other foraminated material, serve four purposes: first, screens 38 and 39 effect a preliminary cleansing of the oil; secondly, they serve to conduct the oil to and from a relatively large surface of the fine filtering material 43; thirdly, the vertically extending screens 39 and 40 serve by the frictional contact with the fine filtering material 43 to maintain the latter in position and prevent its being compressed upwardly toward the top of the cartridge; and fourthly, by the manner of their positioning they provide numerous oil paths through the fine filtering material 43, all of substantially the same length, so that in operation there is no one path of easy flow, but on the contrary the oil flows uniformly through all parts of the cartridge.

In the foregoing description of the operation of the device it has been assumed that the oil enters the device under optimum and substantially constant pressure conditions. It is important in a filter of this type that the oil pressure in the filtering cartridge be maintained at, or at least below, a predetermined value, for if the pressure becomes substantially greater than that for which the cartridge is designed, some packing of the filtering material will result, and dirty oil may be forced out of the cartridge as water is squeezed out of a sponge. In an internal combustion engine, a constant optimum pressure will not prevail, for the pressure of the oil will vary over a wide range depending upon the speed of the engine. The device automatically compensates for changes of pressure and avoids a forcible ejection of dirty oil in the following manner. Spring 34 in urging the rim 25 of the cartridge into seated relationship with the shoulder 14 causes a certain pre-determined pressure to be established in the sump 18, the spring 34 being of such a strength as to establish a back pressure best adapted for the successful operation of the filtering material in the cartridge. Should the oil be delivered to the casing 11 at a substantially higher pressure the cartridge 24 will be forced upwardly off its seat on shoulder 14, thus valving or by-passing a greater portion of the oil and in effect reducing the pressure differential between the bottom and the top of the cartridge 24. Thus the effective pressure of the oil operating on the cartridge is regulated by spring 34 and is maintained substantially constant and independent of the oil pressure in the intake nipple 16. In practice the cartridge 24 will be designed to operate at the oil pressure obtaining at moderate engine speed and the spring 34 will be selected to maintain the cartridge 24 on its seat at this pressure. At higher engine speeds the device will operate with the cartridge 24 slightly raised from its seat.

The yielding seal between the rim 26 of the cartridge and the shoulder 14 of the casing 11 and the resulting valve action of the cartridge 24 has also an important and beneficial effect upon the cold weather operation of the device. If, in the wintertime, the engine and oil filter have not been in use for a short period, both will have assumed atmospheric temperature. This temperature may be so low that the oil within the cartridge will have somewhat congealed and become so high in viscosity as to render the filtering cartridge substantially impermeable. Under these conditions it would be advisable to provide means whereby the viscous oil is not forced through the container 24, thereby causing undue packing of the fine filtering material 43. It would likewise be advantageous to provide means whereby the cartridge may be heated to such a temperature as will allow the proper operation thereof.

The device illustrated accomplishes each of these objects in the following manner: inasmuch as the cold oil within the cartridge 24 partially or wholly prevents a flow of oil through the cartridge the back pressure in the sump 18 is substantially increased. This increased back pressure causes the cartridge 24 to raise up from the bottom of the container, flexing spring 34 somewhat, and thereby permitting the oil to flow past the aperture then existing between the rim 25 and the shoulder 14, thence upwardly in space 26 between the cartridge 24 and the inner wall of the casing 11 and out through the outlet orifice 21. In this manner cold and viscous oil is not forceably driven through the filtering cartridge 24. As the engine continues to operate the oil temperature rises rather rapidly. This warm oil flowing upwardly between the cartridge and the inner wall of the casing and being in contact with the cartridge 24 throughout its entire surface, quickly transfers heat to the interior of the cartridge and restores the oil therein to operating temperature, at which time the filtering material becomes permeable and the passage of oil therethrough begins to take place. Simultaneously, the back pressure in the sump 18 is reduced and the spring 34 urges the cartridge down into normal operating position, thereby closing the gap between the edge 25, the shoulder 14 and restoring the device to normal operating conditions wherein most of the oil delivered to the device passes through the filtering cartridge 24 and is filtered.

It will be noted that the filtering cartridge 24 can easily and quickly be removed from the device when it has become saturated with impurities removed from oil and a new cartridge substituted. The operation involves merely the loosening and removal of the cross piece 37, the removal of the coverplate 32 and the substitution of a new cartridge for the old one. It is unnecessary to detach the oil connections to and from the device.

Though I have described but one adaptation of the invention and have shown its use with particular reference to internal combustion engines, it is understood that the device is susceptible to numerous other uses and to the filtering of fluids other than engine oil and it is likewise understood that numerous modifications may be made in the structural features of the invention without in any way departing from the scope of the invention as defined in the appended claims.

I claim:

1. A filtering cartridge for a filter of the class described comprising a container of impermeable material, the inlet end of said container being perforated and the outlet end of said container being perforated, a foraminated screen directly inwardly of said inlet end, a second foraminated screen within said container and adjacent the side walls thereof and extending from said inlet end partway towards said outlet end, a core of mesh-like material within said container and beginning at a point spaced from said inlet end and extending centrally in said cartridge to said outlet end and fine filtering material substantially filling the remaining portion of said container.

2. A filtering cartridge for a filter of the class described comprising a container of impermeable material, the inlet end of said container being perforated and the outlet end of said container being perforated, a foraminated screen directly inwardly of said inlet end, a foraminated screen within said container and adjacent the side walls thereof and extending from said inlet portion partway towards said outlet portion, a core of screen or mesh material within said container and beginning at a point spaced from said inlet end and extending centrally in said cartridge to said outlet end, a layer of screen material directly inwardly of said outlet end and fine filtering material substantially filling the remaining portion of said container.

ARTHUR D. REDNER.